3,121,074
NITRO SUBSTITUTED 3H-1,4-BENZODIAZEPINE
COMPOUNDS
Oscar Keller, Clifton, Norbert Steiger, Nutley, and Leo Henryk Sternbach, Upper Montclair, N.J., assignors to Hoffmann-La Roche Inc., Nutley, N.J., a corporation of New Jersey
No Drawing. Filed Mar. 21, 1962, Ser. No. 181,442
2 Claims. (Cl. 260—239)

This invention relates to substituted benzodiazepine compounds which have been found to possess valuable therapeutic properties. The invention also deals with intermediates for said compounds and methods of making said compounds. The benzodiazepine compounds of this invention all contain a phenyl substituent in the 5-position. Compounds of this invention are 5-phenyl-2-amino-3H-1,4-benzodiazepine 4-oxides.

As used in this disclosure, the term lower alkyl includes saturated branched chain or straight chain aliphatic hydrocarbon groups such as ethyl, methyl, propyl, isopropyl, n-butyl, iso-butyl, t-butyl, amyl and the like. The term halogen includes all four halogens, i.e. chlorine, bromine, iodine and fluorine. The lower acylamino groups represented by $R_3$, $R_4$ and $R_5$ are those in which the acyl radicals are derived from lower fatty (alkanoic) acids, forming groups such as acetylamino, propionylamino and the like.

Compounds of the invention are selected from the group consisting of compounds of the formula (I)
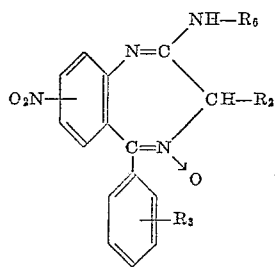

wherein $R_2$ and $R_6$ are selected from the group consisting of hydrogen and lower alkyl, and $R_3$ is selected from the group consisting of hydrogen, halogen, lower alkyl, nitro, amino and lower acylamino.

The basic benzodiazepine compounds of this invention, i.e. the compounds of Formula I above form acid addition salts. Since these compounds are valuable therapeutic agents, medicinally acceptable acid addition salts formed from pharmaceutically acceptable acids are preferred. These basic compounds of Formula I above form pharmaceutically acceptable acid addition salts with both organic and inorganic acids, such as hydrochloric acid, nitric acid, hydrobromic acid, p-toluene sulfonic acid, citric acid, maleic acid, succinic acid, mandelic acid, acetic acid, sulfuric acid, phosporic acid, tartaric acid, and the like.

The compounds of this invention are derived from substituted 2-aminobenzophenones. Several synthetic routes can be employed.

Compounds of Formula I above can be prepared by reacting compounds of the formula (II)
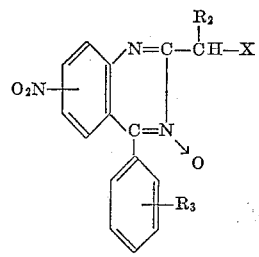

wherein $R_2$ is selected from the group consisting of hydrogen and lower alkyl, $R_3$ is selected from the group consisting of hydrogen, halogen, lower alkyl, nitro, amino and lower alkanoylamino, and X is a halogen, with ammonia or with a primary amine whereby the 6-membered heterocyclic ring of the quinazoline is enlarged to the 7-membered heterocyclic ring of the benzodiazepine structure.

Compounds corresponding to Formula I above can be converted to the corresponding amino compound by reducing the nitro group, for example, catalytically in the presence of Raney nickel. A lower alkanoyl group can be attached to the amino group by reacting with a lower alkanoic acid anhydride, such as acetic anhydride.

It is also possible, as a further alternative, to first produce a 2-amino-5-phenyl-3H-1,4-benzodiazepine 4-oxide containing no substituent, or a group such as a halogen or lower alkyl on the 5-position phenyl ring and then introduce a nitro group by nitration with nitric acid. The 2-amino-5-phenyl-3H - 1,4 - benzodiazepine 4-oxide compounds referred to above which do not contain a nitrogen containing group are not a part of this invention but their preparation is disclosed herein in order that the present disclosure may be complete.

The compounds corresponding to Formula II above can be prepared by first acylating with an α-haloacyl-halide or -anhydride compounds of the formula (III)
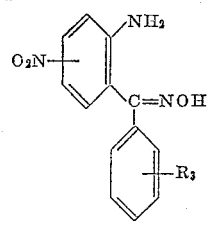

wherein $R_3$ is selected from the group consisting of hydrogen, halogen, lower alkyl, nitro, amino and lower acylamino and then effecting ring closure to a compound of Formula II via dehydration by acids, such as hydrogen chloride, concentrated sulfuric acid, and the like.

Certain of the 2-aminobenzophenones used as intermediates herein are novel compounds and are included within the scope of the invention.

The compounds described above conforming to Formula I are useful as muscle relaxants and anti-convulsants. They can be used for the relief of tension and also in depressed states associated with tension. They can be administered by incorporating a therapeutic dosage of the compound, or a pharmacologically acceptable acid addition salt when formed, adjusted according to its nature and individual requirements, in a conventional liquid or solid vehicle to provide elixirs, suspensions, tablets, capsules, powders or the like according to conventional pharmaceutical practice.

This application is a continuation-in-part of application Serial No. 38,732, filed June 27, 1960, now abandoned; and application Serial No. 104,227, filed April 10, 1961.

Certain of the intermediates which are used in the production of the compounds of the formulas shown above are novel. The method of producing such compounds is evident from the working examples which disclose their synthesis in detail. The following examples are illustrative and not limitative of the invention. All temperatures are expressed in degrees centigrade.

*Example 1*

A mixture of 72 g. (0.30 mole) of 2-amino-5-nitrobenzophenone, 34 g. of hydroxylamine hydrochloride, 90 g. of powdered KOH, 500 cc. of alcohol and 25 cc. of water was refluxed on a steam bath with stirring for 15 minutes. It was then cooled to room temperature and poured into a solution of 160 cc. concentrated HCl in 1000 cc. of water. The suspension of the precipitated crude product was cooled in ice and then filtered off, washed acid-free with ice water, and sucked dry, and crystallized from ethanol in needles, giving 2-amino-5-nitrobenzophenone oxime, M.P.=203–205°.

*Example 2*

To a suspension of 10 g. (0.039 mole) of 2-amino-5-nitrobenzophenone oxime in 100 cc. of acetic acid, warmed to 50–60°, 6 cc. (0.08 mole) of chloroacetyl chloride was added in small portions, with stirring. The resulting brown solution was stirred at 50–60° for 3 hours and then allowed to stand at room temperature overnight.

The reaction mixture was then saturated with hydrogen chloride and concentrated in vacuo. The residue was dissolved in 200 cc. of warm methylene chloride and was then cooled to 0°. 50 g. of crushed ice was added to the reaction mixture, then 30 cc. 1 N NaOH dropwise until a pH of 8–9 was reached. The mixture was transferred to a separatory funnel and 150 cc. water were added. The organic phase was separated and dried over $Na_2SO_4$.

The methylene chloride solution was treated with activated charcoal, filtered, and evaporated to dryness in vacuo to give a yellow crystalline residue. The crude product was purified by refluxing in a mixture of 200 cc. acetone and 100 cc. methylene chloride with 15 g. of activated charcoal. 2-chloromethyl-4-phenyl-6-nitroquinazoline 3-oxide crystallized in yellow prisms on cooling of the filtered mixture. M.P.=205°–207°.

*Example 3*

6.0 g. (0.019 mole) of 2-chloromethyl-4-phenyl-6-nitroquinazoline 3-oxide was added in portions to 150 cc. of a 25% solution of methylamine in methanol at 5° C. with cooling and stirring. After a few minutes, a yellow crystalline substance started to separate. The reaction mixture was stirred at room temperature for 24 hours then allowed to stand for another 24 hours. The yellow product was filtered off, washed with a little methanol, sucked dry, and crystallized in needles from ether-methanol giving 7-nitro-2-methylamino-5-phenyl-3H-1,4-benzodiazepine 4-oxide, which melted at 260°–261° (dec.).

*Example 4*

6.3 g. (0.02 mol.) of 2-chloromethyl-4-phenyl-6-nitroquinazoline 3-oxide was suspended in 170 cc. of 12% ethanolic ammonia. The dark reddish brown solution was stirred for 24 hours at room temperature. The yellow prisms were filtered off, washed with ethanol, and sucked dry giving 2-amino-7-nitro-5-phenyl-3H-1,4-benzodiazepine 4-oxide. M.P.=243° (dec.).

We claim:
1. A compound selected from the group consisting of compounds of the formula

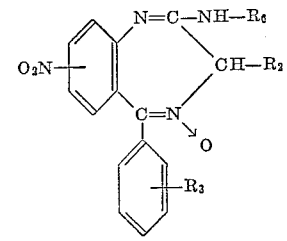

and their pharmaceutically acceptable acid addition salts, wherein $R_2$ and $R_6$ are selected from the group consisting of hydrogen and lower alkyl, and $R_3$ is selected from the group consisting of hydrogen, halogen, lower alkyl, nitro, amino and lower alkanoylamino.

2. 7-nitro-5-phenyl-2-methylamino-3H-1,4-benzodiazepine 4-oxide.

References Cited in the file of this patent
UNITED STATES PATENTS 2,893,992    Sternbach _____ July 7, 1959

OTHER REFERENCES

Yale: Jour. of Med. and Pharm. Chem., vol. 1, No. 2 (1959), pp. 121–133.

Culvenor: Reviews of Pure and Applied Chemistry, vol. 3, No. 2, June 1953, pp. 83–109.